June 28, 1955     L. A. BOZEK ET AL     2,711,698

POWER TRANSMISSION

Filed March 7, 1952

*INVENTORS*
LEO A. BOZEK
JOSEPH J. MC GINNIS
BY

*Ralph L. Tweedale*

ATTORNEY

United States Patent Office 2,711,698
Patented June 28, 1955

2,711,698
POWER TRANSMISSION

Leo A. Bozek, Detroit, and Joseph J. McGinnis, Inkster, Mich., assignors to Vickers Incorporated, Detroit, Mich., a corporation of Michigan Application March 7, 1952, Serial No. 275,416

14 Claims. (Cl. 103—136)

This invention relates to power transmissions, particularly to those of the type comprising two or more fluid pressure energy translating devices, one of which may function as a pump and another as a fluid motor.

More particularly, the present invention concerns an improvement in rotary fluid pressure energy translating devices of the type utilizing a plurality of alternately expanding and contracting working chambers brought into communication with supply and discharge passages in proper phase relation with said expansion and contraction by positively acting mechanical valving.

Such devices are customarily constructed with closed center valving. The expression "closed-center," when used in this respect, means that each of the working chambers is momentarily cut off from both the supply and discharge passage as its volume ceases to expand and starts to contract or vice versa. This prevents a momentary "short circuit" between the supply and return passages through the working chamber.

Further, most successful devices of this nature have been those wherein a hydraulically balanced form of construction is utilized. This is ordinarily accomplished by distribution of the various pressure zones in radial symmetry around the axis of the rotor so the pressure forces created will substantially balance each other.

The invention is particularly well adapted for use with a balanced type radially sliding vane pump such as illustrated in the patent to Harry F. Vickers, 1,989,900, although it is pointed out that the present invention is applicable to both fluid pumps and motors and further, is not limited to those of the vane type.

In such devices much effort has been devoted to reducing the noise level. Lowering the noise level usually has the further effect of increasing unit life since excessive noise and excessive wear often go hand in hand. The valving of such units has been found to be the source of much of the noise and has been the subject of much experimentation in efforts to make these units noise-free under all the various operating conditions encountered. These attempts have heretofore not been entirely successful. One of the reasons for this is that although such valving can be designed to mathematical perfection, necessary machining tolerances make such perfection unattainable in practice. Maintenance of closer tolerances has somewhat improved the performance of such units in the past, but, of course, has increased manufacturing costs.

It is an object of the present invention to provide an improved fluid pressure energy translating device, capable of functioning as either a pump or a motor, which retains the advantages of positive mechanically operated valving and yet which is capable of operating silently throughout a great range of speed and pressure.

A further object is to provide a device of this character having greatly improved operating characteristics but capable of manufacture at lower cost than prior devices by reason of greater permissible machining tolerances.

Further objects and advantages of the present invention will be apparent from the following description, reference being had to the accompanying drawing wherein a preferred form of the present invention is clearly shown.

Figure 1:
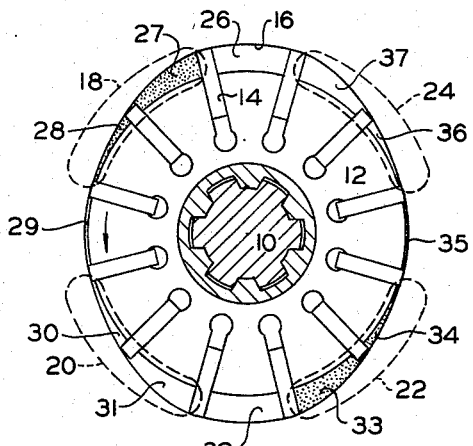
Figure 1 is a transverse partial section showing pumping mechanism of the type described in the above-mentioned patent to Vickers, and corresponds to Figure 8 of that patent.

Referring now to Figures 1 through 4 there is shown a shaft 10, rotor 12, radially slidable vanes 14, and a cam ring 16. The dotted outlines of the kidney-shaped ports 18, 20, 22, and 24 indicate the positional relationship in which the actual ports overlie the space between the rotor and the cam ring through which the vanes 14 move. Between each pair of adjacent vanes 14 there is a working chamber. These working chambers are designated 26 through 37 in Figure 1. Fluid enters and leaves each working chamber axially through the open side of said working chamber which cooperates with said kidney-shaped ports. It should be noted that each working chamber has a complementary working chamber diametrically across the rotor. For example, 26 and 32, 27 and 33, 28 and 34, etc. Arrangement of the contour of cam ring 16 and the placement of kidney ports 18, 20, 22, and 24 are such that pressures in each pair of complementary working chambers are theoretically maintained equal, thus hydraulically balancing the rotor 14 as explained in the Vickers patent previously referred to.

Figure 2:
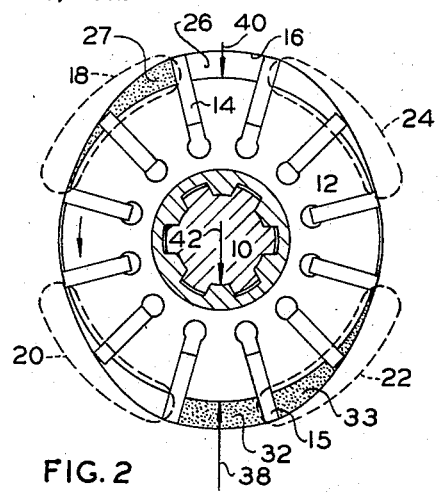
Figure 2 is a view similar to Figure 1 but illustrating the effect of a machining irregularity.

However, this theoretical balance is disturbed by various unavoidable machining irregularities as represented in Figure 2 by the mislocated vane 15.

For purposes of clarity in illustration, the vane spacing irregularity herein discussed has been shown exaggerated in the drawing. It is intended to be merely representative and other imperfections, and combinations thereof, such as improperly spaced high and low pressure ports or radial shift of the rotor, can also cause noisy operation. Assuming operation as a pump and rotation in the direction indicated by the arrow, the ports 18 and 22 will be at the same high pressure and ports 20 and 24 will be at the same low pressure. Those working chambers under high pressure are shown speckled for clarity of illustration. Mislocated vane 15 will thus place working chamber 32 in communication with high pressure fluid before its complementary working chamber 26. The result is sudden creation of a pressure force, indicated by arrow 38, much greater than the pressure force 40 and the resultant unbalance of the rotor requires application of a mechanical force, indicated at 42, to restore equilibrium to the rotor.

Figure 3:
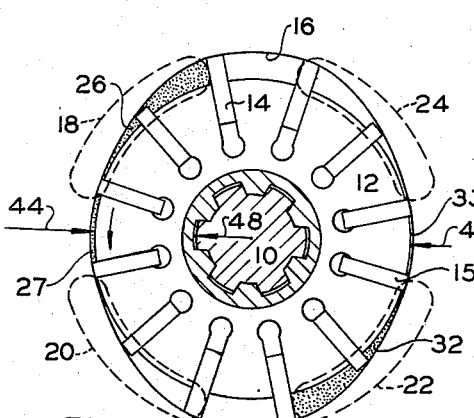
Figure 3 is a view similar to Figure 2 but in which the rotor is turned approximately 60 degrees.

In Figure 3, rotor 12, having the same defect as in Figure 2, has been rotated through approximately 60 degrees. As shown, complementary working chambers 26 and 32 are now balanced, but mislocated vane 15 has cut off working chamber 33 from the high pressure in port 22. Hence, pressure in working chamber 33 has dropped although working chamber 27 is still connected to high pressure port 18. This condition results in forces indicated by arrows 44, 46, and 48 analogous to those of Figure 2.

It can thus be seen that so-called hydraulically balanced units of this type may actually have a plurality of shifting forces requiring mechanical counteraction. Much of the noise and wear in such units results from impact at the point of application of the mechanical counteracting forces.

Figure 4:
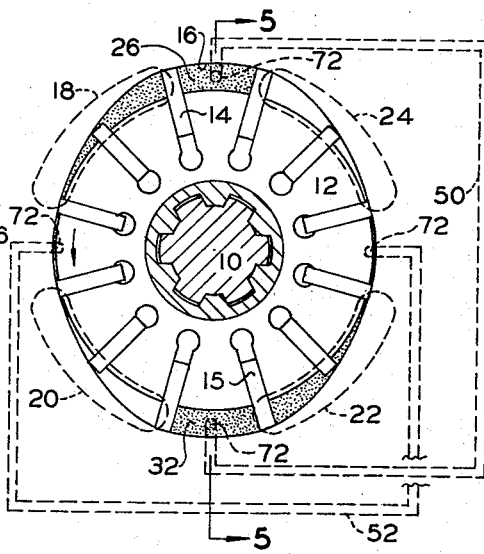
Figure 4 is a view similar to Figure 2 but schematically illustrating the present invention.

As illustrated schematically in Figure 4, the present invention proposes use of balancing passages indicated at 50 and 52 to interconnect those complementary working chambers otherwise isolated from points of equal pressure by the closed center valving of the device. It is apparent in Figure 4 that although vane 15 is mislocated in the same manner as in Figure 2, passage 50 will equalize pressures in the complementary working chambers 26 and 32, thus maintaining the hydraulic balance of the unit. Similarly, when rotor 12 moves to the position illustrated in Figure 3, passage 52 will equalize pressures in complementary working chambers 27 and 33. Further, it is pointed out that since ports 18 and 22 are points of equal pressure as are ports 20 and 24, provision of balancing passages 50 and 52 to interconnect those complementary working chambers otherwise in unbalance because of valving irregularities insures that every working chamber in the unit is hydraulically balanced by its complementary working chamber at all times.

Figure 5:
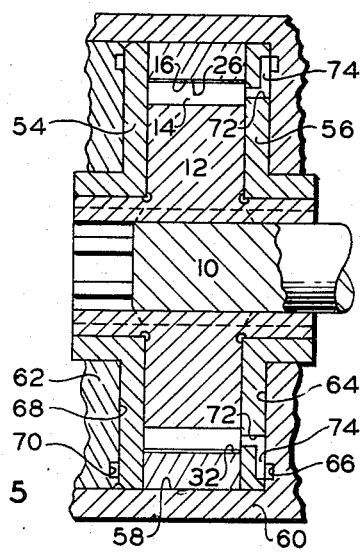
Figure 5 is a longitudinal partial section taken through pumping mechanism embodying the present invention and corresponds to a section on line 5—5 of Figure 4.

Referring now to Figure 5, the invention is shown embodied in pumping mechanism of the type described. The rotor 12, vanes 14, and cam ring 16 are sandwiched between flanged bushings 54 and 56 and retained in bore 58 of body 60 by an endwise abutting cap member 62 in a manner well known in the art. The end wall 64 of bore 58 is circumferentially grooved at 66 to provide a fluid passage corresponding to passage 50 in Figure 4, and groove 70 in the face 68 of the cap member 62 corresponds to passage 52 in Figure 4. Groove 66 interconnects one pair of diametrically opposed cutoff portions of the valving through balance holes 72 and short radial grooves 74 in the bushing member 56. Similar balance holes and radial grooves, not shown, in bushing member 54 interconnect the other pair of cutoff portions through circumferential groove 70. It is pointed out that the balance holes 72 have a diameter less than the thickness of vanes 14, thus preventing an open-center, or "short circuit," condition as the vanes cross over the balance holes.

Although the device shown embodying the present invention is in complete hydraulic balance, it has been found in testing that, especially in the case of a fluid motor, the passage 50 alone, connecting across the major diameter of the cam ring, works a much more marked improvement in operation than passage 52 alone, connecting across the minor diameter.

It will thus be seen that the present invention has provided a greatly improved fluid pump or motor which is quieter in operation and has a longer service life than prior devices, yet is less expensive to manufacture.

While the form of embodiment of the invention as herein disclosed constitutes a preferred form, it is to be understood that other forms might be adopted, all coming within the scope of the claims which follow.

What is claimed is as follows:

1. In a fluid pressure energy translating device of the type having a rotor, a plurality of expansible working chambers angularly distributed around the rotor axis, each of said working chambers having at least one other working chamber complementary thereto whose pressure cycles are substantially in phase therewith positioned in radial symmetry therewith about the rotor axis to produce hydraulic balance of the rotor, and having valve means including a plurality of high and low pressure ports alternately connectable with said working chambers and spaced apart by cutoff portions of sufficient extent to interrupt communication between the chambers and ports and thus provide closed center valving, that improvement comprising: means forming at least one fluid passage independent of said high and low pressure ports interconnecting said complementary working chambers during transition of said complementary working chambers from communication with said ports to isolation therefrom.

2. In a fluid pressure energy translating device of the type having a rotor, a plurality of expansible working chambers angularly distributed around the rotor axis, each of said working chambers having at least one other working chamber complementary thereto whose pressure cycles are substantially in phase therewith positioned in radial symmetry therewith about the rotor axis to produce hydraulic balance of the rotor, and having valve means including a plurality of high and low pressure ports alternately connectable with said working chambers and spaced apart by cutoff portions of sufficient extent to interrupt communication between the chambers and ports and thus provide closed center valving, that improvement comprising: means to interconnect said complementary working chambers during transition of said complementary working chambers to and from communication with said ports from and to isolation therefrom, comprising balance holes in said cut-off portions and fluid passage means connecting said balance holes.

3. In a fluid pressure energy translating device of the type having a rotor, a plurality of expansible working chambers angularly distributed around the rotor axis, each of said working chambers having at least one other working chamber complementary thereto whose pressure cycles are substantially in phase therewith positioned in radial symmetry therewith about the rotor axis to produce hydraulic balance of the rotor, and having valve means including a plurality of high and low pressure ports alternately connectable with said working chambers and spaced apart by cutoff portions of sufficient extent to interrupt communication between the chambers and ports and thus provide closed center valving, that improvement comprising: means to interconnect said complementary working chambers during transition of said complementary working chambers to and from communication with said ports from and to isolation therefrom, comprising balance holes in said cutoff portions and fluid passage means connecting said balance holes, said balance holes being sufficiently small relative to the spacing between adjacent working chambers to prevent the balance holes from interconnecting said adjacent working chambers and thus prevent creation of an open center condition.

4. In a fluid pressure energy translating device of the type having a rotor, a generally elliptical cam ring surrounding the rotor, radially slidable vanes carried in slots in the rotor and dividing the space between the ring and the rotor into a plurality of working chambers, each paired with a diametrically opposed working chamber complementary thereto whose pressure cycles are substantially in phase therewith to produce hydraulic balance of the rotor, abutment members bearing axially against said ring, rotor and vanes in fluid sealing engagement therewith, and diametrically opposed high pressure ports and diametrically opposed low pressure ports in said abutment members spaced apart by cutoff portions of sufficient extent to interrupt communication between the chambers and ports and thus provide closed center valving, that improvement comprising: means forming at least one fluid passage independent of said high and low pressure ports interconnecting said complementary working chambers during their transition from and to the isolation of said cut-off portions.

5. In a fluid pressure energy translating device of the type having a rotor, a generally elliptical cam ring surrounding the rotor, radially slidable vanes carried in slots in the rotor and dividing the space between the ring and the rotor into a plurality of working chambers, each paired with a diametrically opposed working chamber complementary thereto whose pressure cycles are substantially in phase therewith to produce hydraulic balance of the rotor, abutment members bearing axially against said ring, rotor and vanes in fluid sealing engagement therewith, and diametrically opposed high pressure ports and diametrically opposed low pressure ports in said abutment members spaced apart by diametrically opposed cutoff portions of sufficient extent to interrupt communication between the chambers and ports and thus provide closed center valving, that improvement comprising: means to interconnect said diametrically opposed complementary working chambers, during their transition from and to the isolation of said cutoff portions, comprising balance holes in at least one pair of diametrically opposed cutoff portions and fluid passage means connecting said balance holes.

6. In a fluid pressure energy translating device of the type having a rotor, a generally elliptical cam ring surrounding the rotor, radially slidable vanes carried in slots in the rotor and dividing the space between the ring and the rotor into a plurality of working chambers, each paired with a diametrically opposed working chamber complementary thereto whose pressure cycles are substantially in phase therewith to produce hydraulic balance of the rotor, abutment members bearing axially against said ring, rotor and vanes in fluid sealing engagement therewith, and diametrically opposed high pressure ports and diametrically opposed low pressure ports in said abutment members spaced apart by diametrically opposed cutoff portions of sufficient extent to interrupt communication between the chambers and ports and thus provide closed center valving, that improvement comprising: means to interconnect said diametrically opposed complementary working chambers, during their transition from and to the isolation of said cutoff portions, comprising balance holes in each diametrically opposed pair of cutoff portions and a fluid passage to connect the balance holes in each such pair.

7. In a fluid pressure energy translating device of the type having a rotor, a generally elliptical cam ring surrounding the rotor, radially slidable vanes carried in slots in the rotor and dividing the space between the ring and the rotor into a plurality of working chambers, each paired with a diametrically opposed working chamber complementary thereto whose pressure cycles are substantially in phase therewith to produce hydraulic balance of the rotor, abutment members bearing axially against said ring, rotor and vanes in fluid sealing engagement therewith, and diametrically opposed high pressure ports and diametrically opposed low pressure ports in said abutment members spaced apart by diametrically opposed cutoff portions of sufficient extent to interrupt communication between the chambers and ports and thus provide closed center valving, that improvement comprising: means to interconnect said diametrically opposed complementary working chambers, during their transition from and to the isolation of said cutoff portions, comprising balance holes in at least one pair of diametrically opposed cutoff portions and fluid passage means connecting said balance holes, said balance holes being small relative to the thickness of said vanes to prevent the balance holes from interconnecting said adjacent working chambers and thus prevent creation of an open center condition.

8. In a fluid pressure energy translating device of the type having a rotor, a plurality of expansible working chambers circumferentially distributed around the rotor, each of said working chambers having at least one other working chamber complementary thereto whose pressure cycles are substantially in phase therewith and so positioned with respect thereto as to produce hydraulic balance of the rotor, and having valve means including a plurality of high and low pressure ports alternately connectable with said working chambers and spaced apart by cut-off portions of sufficient extent to interrupt communication between the chambers and ports and thus provide closed center valving, that improvement comprising: means forming at least one fluid passage independent of said high and low pressure ports interconnecting said complementary working chambers during their transition from and to the isolation of said cut-off portions.

9. In a fluid pressure energy translating device of the type having a rotor, a plurality of expansible working chambers angularly distributed around the rotor axis, each of said working chambers having at least one other working chamber complementary thereto whose pressure cycles are substantially in phase therewith positioned in radial symmetry therewith about the rotor axis to produce hydraulic balance of the rotor, and having valve means including a plurality of high and low pressure ports alternately connectable with said working chambers and spaced apart by cutoff portions of sufficient extent to interrupt communication between the chambers and ports and thus provide closed center valving, that improvement comprising: means forming at least one fluid passage independent of said high and low pressure ports interconnecting said complementary working chambers during transition of said complementary working chambers into communication with said ports from isolation therefrom.

10. In a fluid pressure energy translating device of the type having a rotor, a plurality of expansible working chambers angularly distributed around the rotor axis, each of said working chambers having at least one other working chamber complementary thereto whose pressure cycles are substantially in phase therewith positioned in radial symmetry therewith about the rotor axis to produce hydraulic balance of the rotor, and having valve means including a plurality of high and low pressure ports alternately connectable with said working chambers and spaced apart by cutoff portions of sufficient extent to interrupt communication between the chambers and ports and thus provide closed center valving, that improvement comprising: means forming at least one fluid passage independent of said high and low pressure ports interconnecting said complementary working chambers during transition of said complementary working chambers to and from communication with said ports from and to isolation therefrom.

11. In a fluid pressure energy translating device of the type having a rotor, a plurality of expansible working chambers circumferentially distributed around the rotor, each of said working chambers having at least one other working chamber complementary thereto whose pressure cycles are substantially in phase therewith and so positioned with respect thereto as to produce hydraulic balance of the rotor, and having valve means including a plurality of high and low pressure ports alternately connectable with said working chambers and spaced apart by cutoff portions, the circumferential extent of said cutoff portions being slightly greater than the circumferential extent of one, but substantially less than that of two, of said working chambers to interrupt communication between the chambers and ports and thus provide closed center valving, that improvement comprising: means forming at least one fluid passage independent of said high and low pressure ports interconnecting said complementary working chambers and spaced from each adjacent port by less than the circumferential extent of one working chamber to provide communication of said passage with each port alternately at the times while communication of the working chamber with each port is being established and interrupted.

12. In a fluid pressure energy translating device of the type having a rotor, a plurality of expansible working chambers angularly distributed around the rotor axis, each of said working chambers having at least one other working chamber complementary thereto whose pressure cycles are substantially in phase therewith positioned in radial symmetry therewith about the rotor axis to produce hydraulic balance of the rotor, and having valve means including a plurality of high and low pressure ports alternately connectable with said working chambers and spaced apart by cutoff portions, the circumferential extent of said cutoff portions being slightly greater than the circumferential extent of one, but substantially less than that of two, of said working chambers to interrupt communication between the chambers and ports and thus provide closed center valving, that improvement comprising: means forming at least one fluid passage independent of said high and low pressure ports interconnecting said complementary working chambers and spaced from each adjacent port by less than the circumferential extent of one working chamber to provide communication of said passage with each port alternately at the times while communication of the working chamber with each port is being established and interrupted.

13. In a fluid pressure energy translating device of the type having a rotor, a plurality of expansible working chambers angularly distributed around the rotor axis, each of said working chambers having at least one other working chamber complementary thereto whose pressure cycles are substantially in phase therewith positioned in radial symmetry therewith about the rotor axis to produce hydraulic balance of the rotor, and having valve means including a plurality of high and low pressure ports alternately connectable with said working chambers and spaced apart by cutoff portions, the circumferential extent of said cutoff portions being slightly greater than the circumferential extent of one, but substantially less than that of two, of said working chambers to interrupt communication between the chambers and ports and thus provide closed center valving, that improvement comprising: means to interconnect said complementary working chambers while at least one of them is blocked by said cutoff portion, comprising balance holes in said cutoff portions and fluid passage means connecting said balance holes, said balance holes being spaced from each adjacent port by less than the circumferential extent of one working chamber to provide communication of said passage with each port alternately at the times while communication of the working chamber with each port is being established and interrupted.

14. In a fluid pressure energy translating device of the type having a rotor, a plurality of expansible working chambers circumferentially distributed around the rotor, each of said working chambers having at least one other working chamber complementary thereto whose pressure cycles are substantially in phase therewith and so positioned with respect thereto as to produce hydraulic balance of the rotor, and having valve means including a plurality of high and low pressure ports alternately connectable with said working chambers and spaced apart by cutoff portions of sufficient extent to interrupt communication between the chambers and ports and thus provide closed center valving, that improvement comprising: means, including a closed fluid path between at least two of said cutoff portions, for continuously interconnecting said complementary working chambers to insure balanced pressures therein.

References Cited in the file of this patent
UNITED STATES PATENTS

| | | |
|---|---|---|
| 1,989,900 | Vickers | Feb. 5, 1935 |
| 2,255,784 | Kendrick | Sept. 16, 1941 |
| 2,491,365 | Ernst | Dec. 13, 1949 |
| 2,653,551 | Rosaen | Sept. 29, 1953 |